US009547406B1

(12) United States Patent
Wheeler et al.

(10) Patent No.: US 9,547,406 B1
(45) Date of Patent: Jan. 17, 2017

(54) VELOCITY-BASED TRIGGERING

(75) Inventors: Aaron Wheeler, San Francisco, CA (US); Max Benjamin Braun, San Francisco, CA (US)

(73) Assignee: Google Inc., Mountain View, CA (US)

(*) Notice: Subject to any disclaimer, the term of this patent is extended or adjusted under 35 U.S.C. 154(b) by 888 days.

(21) Appl. No.: 13/285,597

(22) Filed: Oct. 31, 2011

(51) Int. Cl.
*H03K 17/94* (2006.01)
*G06F 3/048* (2013.01)

(52) U.S. Cl.
CPC .................................. *G06F 3/048* (2013.01)

(58) Field of Classification Search
CPC .... G06F 1/00; G06F 2003/00; G06F 2101/00; G06F 2200/00; G06F 2201/00
USPC ......................................................... 715/810
See application file for complete search history.

(56) References Cited

U.S. PATENT DOCUMENTS

| | | |
|---|---|---|
| 5,850,211 A | 12/1998 | Tognazzini |
| 5,880,733 A | 3/1999 | Horvitz et al. |
| 5,900,849 A | 5/1999 | Gallery |
| 5,977,935 A | 11/1999 | Yasukawa et al. |
| 6,064,749 A | 5/2000 | Hirota et al. |
| 6,124,843 A | 9/2000 | Kodama |
| 6,184,847 B1 | 2/2001 | Fateh et al. |
| 6,292,158 B1 | 9/2001 | Amafuji et al. |
| 6,292,198 B1 | 9/2001 | Matsuda et al. |
| 6,327,522 B1 | 12/2001 | Kojima et al. |
| 6,353,436 B1 | 3/2002 | Reichlen |
| 6,396,497 B1 * | 5/2002 | Reichlen ................. 345/427 |
| 6,538,635 B1 | 3/2003 | Ringot |
| 6,603,491 B2 | 8/2003 | Lemelson et al. |

(Continued)

FOREIGN PATENT DOCUMENTS

| | | |
|---|---|---|
| EP | 2211224 | 7/2010 |
| JP | H0795498 A | 4/1995 |

(Continued)

OTHER PUBLICATIONS

Mark R. Mine et al., "Moving Objects in Space: Exploiting Proprioception in Virtual-Environment Interaction," Proceedings of the 24th Annual Conference on Computer Graphics and Interactive Techniques (Aug. 1997).

(Continued)

*Primary Examiner* — Peiyong Weng
(74) *Attorney, Agent, or Firm* — McDonnell Boehnen Hulbert & Berghoff LLP

(57) ABSTRACT

Methods and devices for providing a user-interface are disclosed. In one embodiment, a method is disclosed comprising receiving data corresponding to a first position of a wearable computing device and responsively causing the wearable computing device to provide a user-interface comprising a view region and a menu. The method further comprises receiving movement data corresponding to an upward movement of the wearable computing device to a second position above the first position and, based on the movement data, making a first determination that the upward movement has an upward angular velocity along an upward direction. The method further includes making a second determination that the upward angular velocity exceeds a threshold upward angular velocity and, responsive to the first and second determinations, causing the wearable computing device to move the menu such that the menu becomes more visible in the view region.

19 Claims, 11 Drawing Sheets

(56) References Cited

U.S. PATENT DOCUMENTS

| | | |
|---|---|---|
| 6,771,294 B1 | 8/2004 | Pulli et al. |
| 6,803,928 B2 | 10/2004 | Bimber et al. |
| 6,951,515 B2 | 10/2005 | Ohshima et al. |
| 7,113,151 B2 | 9/2006 | Kinebuchi |
| 7,162,054 B2 | 1/2007 | Meisner et al. |
| 7,199,807 B2 | 4/2007 | Kobayashi et al. |
| 7,487,462 B2 | 2/2009 | Good et al. |
| 7,693,702 B1 | 4/2010 | Kerner et al. |
| 7,724,278 B2 | 5/2010 | Maguire, Jr. |
| 7,825,996 B2 | 11/2010 | Yamada et al. |
| 7,928,926 B2 | 4/2011 | Yamamoto et al. |
| RE42,336 E | 5/2011 | Fateh et al. |
| 8,405,680 B1 | 3/2013 | Lopes et al. |
| 8,477,108 B2 | 7/2013 | Waller et al. |
| 2001/0006376 A1 | 7/2001 | Numa |
| 2002/0044152 A1 | 4/2002 | Abbott et al. |
| 2002/0105482 A1 | 8/2002 | Lemelson et al. |
| 2002/0126066 A1 | 9/2002 | Yasukawa et al. |
| 2002/0158827 A1 | 10/2002 | Zimmerman |
| 2003/0020707 A1 | 1/2003 | Kangas et al. |
| 2003/0210228 A1 | 11/2003 | Ebersole et al. |
| 2003/0210380 A1 | 11/2003 | Westort et al. |
| 2004/0046711 A1 | 3/2004 | Triebfuerst |
| 2004/0093141 A1 | 5/2004 | Rao et al. |
| 2004/0239670 A1 | 12/2004 | Marks |
| 2005/0104882 A1 | 5/2005 | Kobayashi et al. |
| 2005/0154505 A1 | 7/2005 | Nakamura et al. |
| 2005/0248852 A1* | 11/2005 | Yamasaki ............... 359/630 |
| 2006/0080604 A1 | 4/2006 | Anderson |
| 2006/0090135 A1 | 4/2006 | Fukuda |
| 2006/0139374 A1 | 6/2006 | Ritter et al. |
| 2006/0195252 A1 | 8/2006 | Orr et al. |
| 2007/0035563 A1 | 2/2007 | Biocca et al. |
| 2007/0241936 A1 | 10/2007 | Arthur et al. |
| 2007/0296646 A1 | 12/2007 | Yamamoto et al. |
| 2008/0005702 A1 | 1/2008 | Skourup et al. |
| 2008/0082939 A1 | 4/2008 | Nash et al. |
| 2008/0094417 A1 | 4/2008 | Cohen |
| 2008/0150965 A1 | 6/2008 | Bischoff et al. |
| 2008/0218515 A1 | 9/2008 | Fukushima et al. |
| 2009/0005961 A1 | 1/2009 | Grabowski et al. |
| 2009/0128449 A1 | 5/2009 | Brown et al. |
| 2009/0140845 A1 | 6/2009 | Hioki |
| 2009/0153976 A1 | 6/2009 | Dolgoff |
| 2009/0172596 A1 | 7/2009 | Yamashita |
| 2009/0187389 A1 | 7/2009 | Dobbins et al. |
| 2009/0208052 A1 | 8/2009 | Kaplan |
| 2009/0278917 A1 | 11/2009 | Dobbins et al. |
| 2009/0319178 A1 | 12/2009 | Khosravy et al. |
| 2010/0007807 A1 | 1/2010 | Galstian et al. |
| 2010/0013739 A1 | 1/2010 | Sako et al. |
| 2010/0026629 A1 | 2/2010 | Toebes et al. |
| 2010/0039353 A1 | 2/2010 | Cernasov |
| 2010/0125799 A1 | 5/2010 | Roberts et al. |
| 2010/0138766 A1 | 6/2010 | Nakajima |
| 2010/0149073 A1 | 6/2010 | Chaum et al. |
| 2010/0156676 A1* | 6/2010 | Mooring ............... G06F 3/017 341/20 |
| 2010/0159434 A1 | 6/2010 | Lampotang et al. |
| 2010/0164990 A1 | 7/2010 | Van Doorn |
| 2010/0177403 A1 | 7/2010 | Dolgoff |
| 2010/0205563 A1 | 8/2010 | Haapsaari et al. |
| 2010/0253700 A1 | 10/2010 | Bergeron |
| 2010/0259471 A1 | 10/2010 | Takano et al. |
| 2010/0277496 A1 | 11/2010 | Kawanishi et al. |
| 2010/0283683 A1 | 11/2010 | Kurokawa |
| 2010/0292886 A1 | 11/2010 | Szczerba et al. |
| 2010/0315329 A1 | 12/2010 | Previc et al. |
| 2010/0328344 A1 | 12/2010 | Mattila et al. |
| 2011/0115703 A1 | 5/2011 | Iba et al. |
| 2011/0140994 A1 | 6/2011 | Noma |
| 2011/0161875 A1 | 6/2011 | Kankainen |
| 2011/0214082 A1 | 9/2011 | Osterhout et al. |
| 2011/0221668 A1 | 9/2011 | Haddick et al. |
| 2011/0241908 A1* | 10/2011 | Han ............... G08C 17/00 341/20 |
| 2012/0068913 A1 | 3/2012 | Bar-Zeev et al. |
| 2012/0075168 A1 | 3/2012 | Osterhout et al. |
| 2012/0212399 A1 | 8/2012 | Border et al. |
| 2012/0224060 A1 | 9/2012 | Gurevich et al. |
| 2012/0235902 A1 | 9/2012 | Eisenhardt et al. |
| 2012/0254791 A1 | 10/2012 | Jackson et al. |
| 2012/0293548 A1 | 11/2012 | Perez et al. |
| 2012/0299950 A1 | 11/2012 | Ali et al. |
| 2012/0306850 A1 | 12/2012 | Balan et al. |
| 2013/0044128 A1 | 2/2013 | Liu et al. |
| 2013/0050069 A1 | 2/2013 | Ota |
| 2013/0278631 A1 | 10/2013 | Border et al. |
| 2013/0300637 A1 | 11/2013 | Smits et al. |
| 2013/0328762 A1 | 12/2013 | Mcculloch et al. |
| 2013/0335301 A1 | 12/2013 | Wong et al. |

FOREIGN PATENT DOCUMENTS

| | | |
|---|---|---|
| JP | H11161190 A | 6/1999 |
| WO | 2011/044680 | 4/2011 |

OTHER PUBLICATIONS

International Searching Authority, International Search Report and Written Opinion, PCT International Application No. PCT/US2012/060871 dated Mar. 29, 2013, 12 pages.

Bernatchz et al., "Impact of Spatial Reference Frames on Human Performance in Virtual Reality User Interfaces," Journal of Multimedia, Dec. 2008, pp. 19-32, vol. 3, No. 5.

Breen et al., "Interactive Occlusion and Automatic Object Placement for Augmented Reality," Computer Graphics Forum, Aug. 1996, pp. 11-22, vol. 15, Issue 3.

Cohn, Theodore E., "On the Back of the Bus," 21 University of California Transportation Center: ACCESS Magazine, Fall 2002, pp. 17-21, No. 21.

Dynamic Drive, "Fancy Cursor Script IE," Internet website: http://web.archive.org/web/19990129031353/http://www.dynamicdrive.com/dynamicindexll/fcursor.htm, 1999, 2 pages.

Henderson et al., "Exploring the Benefits of Augmented Reality Documentation for Maintenance and Repair," IEEE Transaction on Visualization and Computer Graphics, 2011, pp. 1355-1368, vol. 17, No. 10.

MIMS, "Augmented Reality Interface Exploits Human Nervous System," MIT Technology Review, Apr. 7, 2011, 3 pages.

Mine, Mark R., "Virtual Environment Interaction Techniques," University of North Carolina Chapel Hill Computer Science Technical Report, May 5, 1995, 18 pages.

* cited by examiner

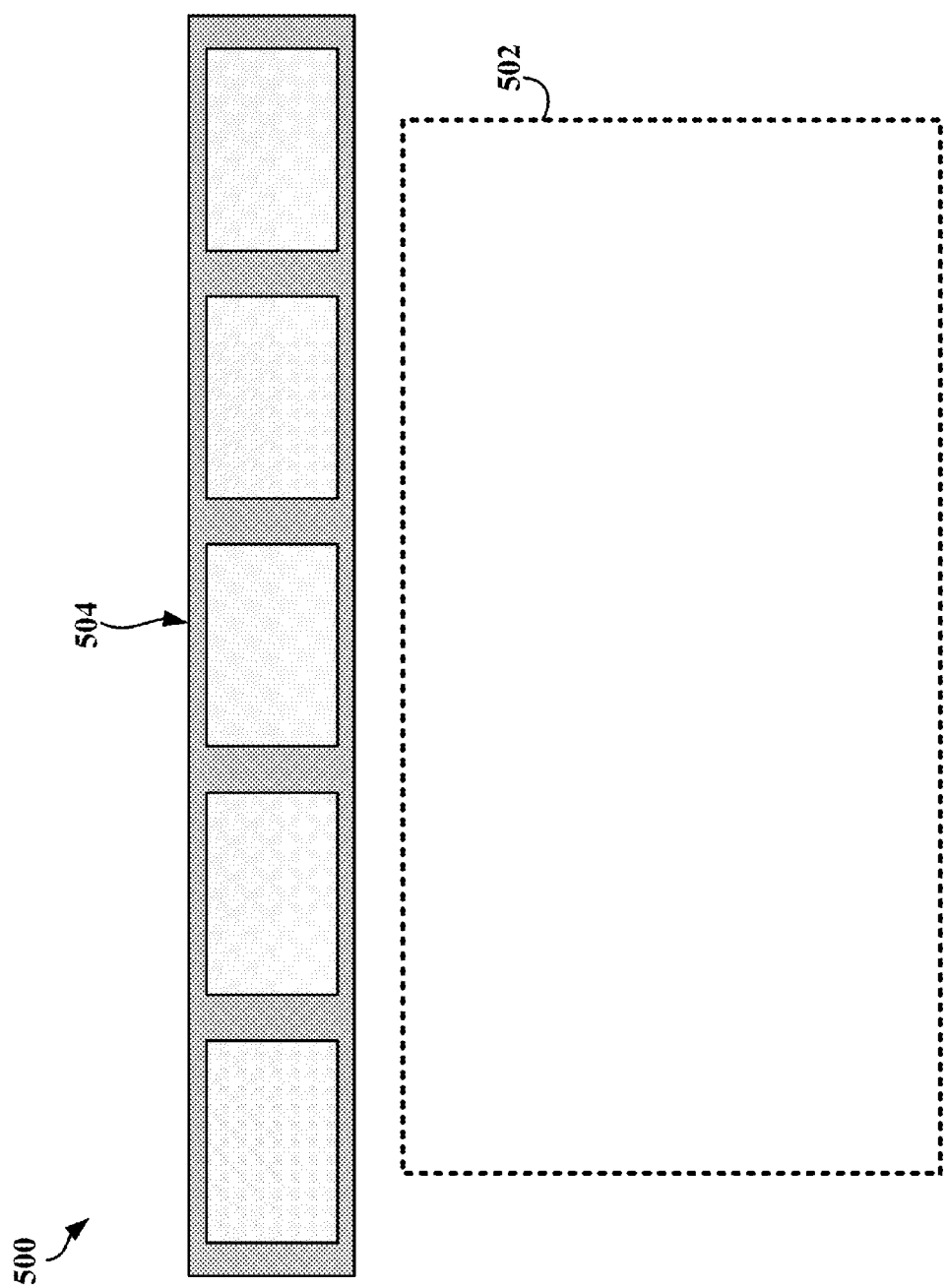

VELOCITY-BASED TRIGGERING

BACKGROUND

Unless otherwise indicated herein, the materials described in this section are not prior art to the claims in this application and are not admitted to be prior art by inclusion in this section.

Augmented reality generally refers to a real-time view of a real-world environment that is augmented with additional content. Typically, a user experiences augmented reality through the use of a computing device. The computing device is typically configured to generate the real-time view of the environment, either by allowing a user to directly view the environment or by allowing the user to indirectly view the environment by generating and displaying a real-time representation of the environment to be viewed by the user.

Further, the computing device is typically configured to generate the additional content. The additional content may include, for example, a user-interface through which the user may interact with the computing device. Typically, the computing device overlays the view of the environment with the user-interface, such that the user sees the view of the environment and the user-interface at the same time.

SUMMARY

In some cases, a user-interface overlaying a view of an environment may obscure one or more objects in the environment or may appear cluttered, which may be undesirable for a user. For this reason, a user-interface that includes content that is outside a view region of the user-interface may be beneficial. The user-interface may be configured to bring the content into the view region in response to a trigger.

Disclosed is such a user-interface. In one embodiment, the user-interface may include a view region and a menu that is not fully visible in the view region.

In one aspect, a method is disclosed. The method comprises receiving data corresponding to a first position of a wearable computing device and responsively causing the wearable computing device to provide a user-interface comprising a view region and a menu. The view region substantially fills a field of view of the wearable computing device and the menu is not fully visible in the view region. The method further comprises receiving movement data corresponding to an upward movement of the wearable computing device to a second position above the first position and, based on the movement data, making a first determination that the upward movement has an upward angular velocity along an upward direction. The method further includes making a second determination that the upward angular velocity exceeds a threshold upward angular velocity and, responsive to the first and second determinations, causing the wearable computing device to move the menu such that the menu becomes more visible in the view region.

In another aspect, a non-transitory computer readable medium is disclosed having stored therein instructions executable by a computing device to cause the computing device to perform the functions of the method described above.

In yet another aspect, a wearable computing device is disclosed. The wearable computing device comprises at least one processor and data storage. The data storage comprises instructions executable by the at least one processor to receive data corresponding to a first position of a wearable computing device and responsively cause the wearable computing device to provide a user-interface comprising a view region and a menu. The view region substantially fills a field of view of the wearable computing device and the menu is not fully visible in the view region. The instructions are further executable by the at least one processor to receive movement data corresponding to an upward movement of the wearable computing device to a second position above the first position and, based on the movement data, make a first determination that the upward movement has an upward angular velocity along an upward direction. The instructions are still further executable by the at least one processor to make a second determination that the upward angular velocity exceeds a threshold upward angular velocity and, responsive to the first and second determinations, cause the wearable computing device to move the menu such that the menu becomes more visible in the view region.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 5A shows aspects of an example user-interface, in accordance with an embodiment.

DETAILED DESCRIPTION

Figure 1A:
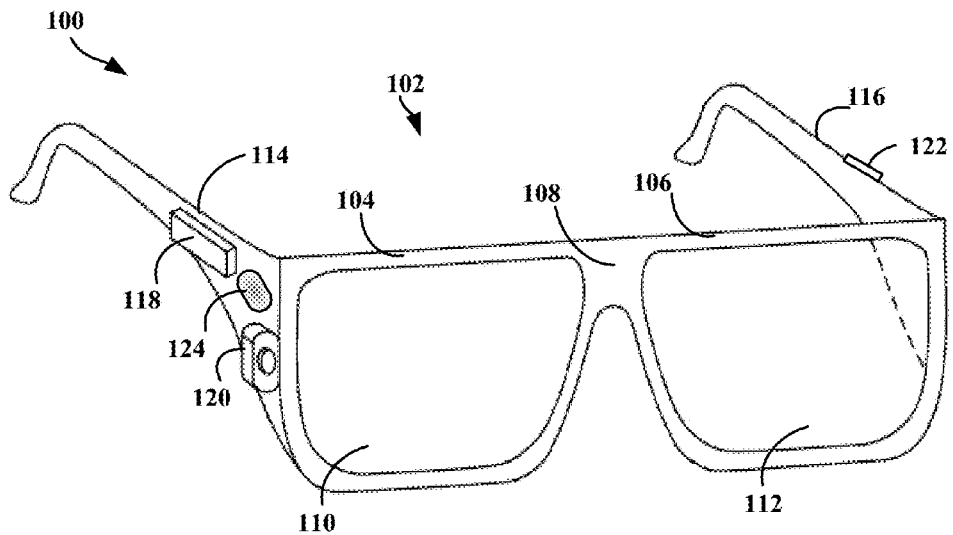
FIG. 1A illustrates an example system for receiving, transmitting, and displaying data, in accordance with an embodiment.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Disclosed is a user-interface that avoids obscuring or cluttering a user's view of an environment. The user-interface may be provided by, for example, a wearable computing device.

The user-interface may include a view region and a menu. In embodiments where the user-interface is provided by a wearable computing device, the view region may substantially fill a field of view of the wearable computing device. Further, the menu may not be fully visible in the view region. For example, the menu may be above the view region, such that only a bottom portion of the menu is visible in the view region. As another example, the menu may be above the view region, and the menu may not be visible at all in the view region. Other examples are possible as well.

The wearable computing device may be configured to detect one or more predetermined movements, such as an upward movement of the wearable computing device. The upward movement may have an upward angular velocity along an upward direction. The upward angular velocity may be, for example, a maximum upward angular velocity of the upward movement over a period of time, or may be an average upward angular velocity over a period of time. The upward angular velocity may take other forms as well.

The wearable computing device may compare the upward angular velocity to a threshold upward angular velocity. The threshold upward angular velocity may be predetermined. For example, the threshold upward angular velocity may be predetermined based on one or more preferences of a user of the wearable computing device. In this example, the user may be able to adjust or vary the threshold upward angular velocity by modifying the preferences. As another example, the threshold upward angular velocity may be predetermined based on calibration data measured during calibration of the wearable computing device. As still another example, the threshold upward angular velocity may have a value that is preset by, for instance, a manufacturer of the device. The threshold upward angular velocity may take other forms as well.

In response to determining that the upward angular velocity exceeds the threshold upward angular velocity, the wearable computing device may cause the menu to become more visible in the view region. For example, one or both of the view region and the menu may move, such that the menu becomes more visible in the view region. Other examples are possible as well.

An example wearable computing device is further described below in connection with FIGS. 1A-4. An example user-interface is further described below in connection with FIGS. 5A-E. An example implementation of an example user-interface on an example wearable computing device is further described below in connection with FIGS. 6A-B. An example method is further described below in connection with FIG. 7.

2. Example System and Device Architecture

FIG. 1A illustrates an example system 100 for receiving, transmitting, and displaying data, in accordance with an embodiment. The system 100 is shown in the form of a wearable computing device. While FIG. 1A illustrates a head-mounted device 102 as an example of a wearable computing device, other types of wearable computing devices could additionally or alternatively be used. Further, in some embodiments, a non-wearable computing device may be used, such as a handheld or otherwise portable computing device (e.g., a mobile phone or tablet computer).

As illustrated in FIG. 1A, the head-mounted device 102 has frame elements including lens-frames 104, 106 and a center frame support 108, lens elements 110, 112, and extending side-arms 114, 116. The center frame support 108 and the extending side-arms 114, 116 are configured to secure the head-mounted device 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well.

One or more of the lens elements 110, 112 may be formed of any material that can suitably display a projected image or graphic (e.g., a user-interface). Each of the lens elements 110, 112 may also be sufficiently transparent to allow a user to see through the lens element. Combining these two features of the lens elements 110, 112 may facilitate an augmented reality or heads-up display where the projected image or graphic is superimposed over a real-world view as perceived by the user through the lens elements 110, 112.

The extending side-arms 114, 116 may each be projections that extend away from the lens-frames 104, 106, respectively, and may be positioned behind a user's ears to secure the head-mounted device 102 to the user. In some embodiments, the extending side-arms 114, 116 may further secure the head-mounted device 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, at least one sensor 122, and a finger-operable touch pad 124. The on-board computing system 118 is shown to be positioned on the extending side-arm 114 of the head-mounted device 102; however, the on-board computing system 118 may be provided on other parts of the head-mounted device 102 or may be positioned remote from the head-mounted device 102 (e.g., the on-board computing system 118 could be connected via a wired or wireless connection to the head-mounted device 102).

The on-board computing system 118 may include a processor and data storage, for example, among other components. The on-board computing system 118 may be configured to receive and analyze data from the video camera 120, the at least one sensor 122, and the finger-operable touch pad 124 (and possibly from other user-input devices, user-interfaces, or both) and generate images and graphics for output by the lens elements 110 and 112. The on-board computing system 118 may additionally include a speaker or a microphone for user input (not shown). An example computing system is further described below in connection with FIG. 4.

The video camera 120 is shown positioned on the extending side-arm 114 of the head-mounted device 102; however, the video camera 120 may be provided on other parts of the head-mounted device 102. The video camera 120 may be configured to capture images at various resolutions or at different frame rates. Video cameras with a small form-factor, such as those used in cell phones or webcams, for example, may be incorporated into an example embodiment of the system 100.

Further, although FIG. 1A illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where images and/or graphics appear to interact with the real-world view perceived by the user.

The at least one sensor 122 is shown on the extending side-arm 116 of the head-mounted device 102; however, the at least one sensor 122 may be positioned on other parts of the head-mounted device 102. The at least one sensor 122 may include one or more movement sensors, such as one or both of a gyroscope or an accelerometer, for example. Other sensing devices may be included within, or in addition to, the at least one sensor 122, or other sensing functions may be performed by the at least one sensor 122.

The finger-operable touch pad 124 is shown on the extending side-arm 114 of the head-mounted device 102; however, the finger-operable touch pad 124 may be positioned on other parts of the head-mounted device 102. Also, more than one finger-operable touch pad may be present on the head-mounted device 102. The finger-operable touch pad 124 may be used by a user to input commands. The finger-operable touch pad 124 may sense at least one of a position and a movement of a finger via capacitive sensing, resistance sensing, or a surface acoustic wave process, among other possibilities. The finger-operable touch pad 124 may be capable of sensing finger movement in a direction parallel and/or planar to a surface of the finger-operable touch pad 124, in a direction normal to the surface, or both, and may also be capable of sensing a level of pressure applied to the pad surface. The finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

Figure 1B:
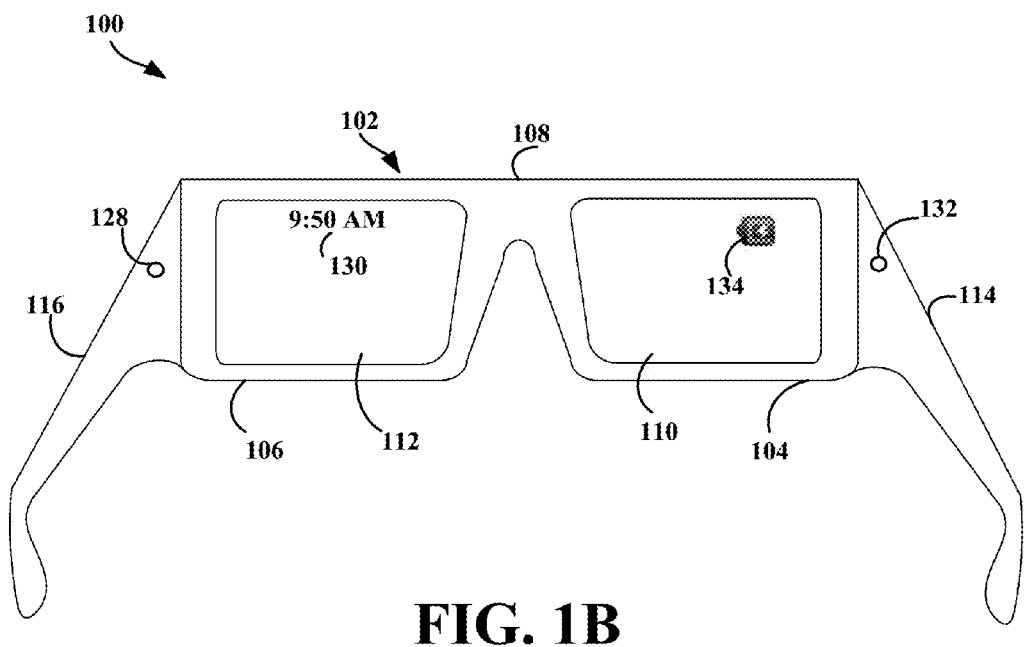
FIG. 1B illustrates an alternate view of the system illustrated in FIG. 1A, in accordance with an embodiment.

FIG. 1B illustrates an alternate view of the system 100 illustrated in FIG. 1A, in accordance with an embodiment. As shown in FIG. 1B, the lens elements 110, 112 may act as display elements. The head-mounted device 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system. Further, in some embodiments, the lens elements 110, 112 may include a coating that reflects the light projected onto them from the projectors 128, 132.

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or light emitting diode (LED) source and scanning system could be used to draw a raster display directly onto the retina of one or more of the user's eyes. In these embodiments, a reflective coating on the lenses 110, 112 may be omitted. Other possibilities exist as well.

Figure 2:
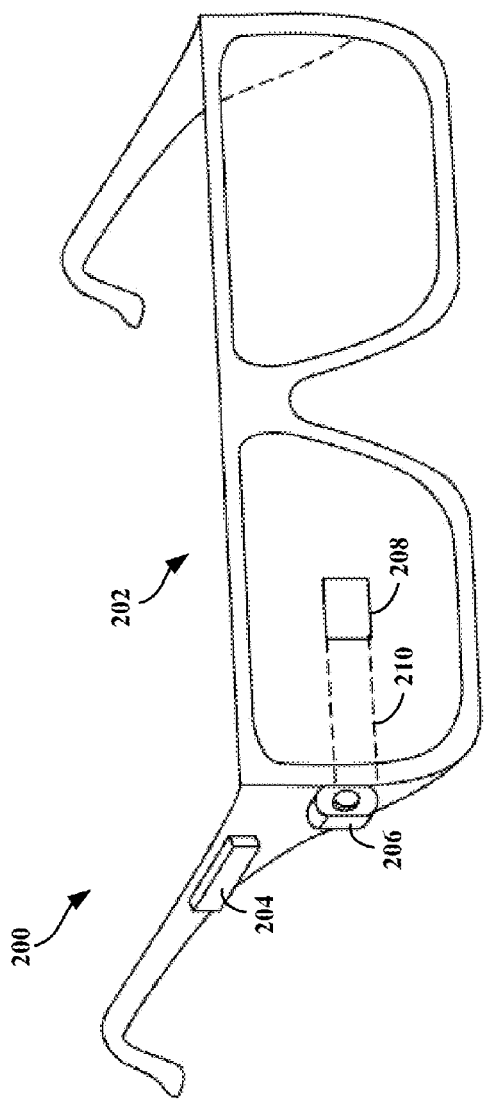
FIG. 2 illustrates another example system for receiving, transmitting, and displaying data, in accordance with an embodiment.

FIG. 2 illustrates another example system 200 for receiving, transmitting, and displaying data, in accordance with an embodiment. The system 200 is shown in the form of a wearable computing device 202. The wearable computing device 202 may include frame elements, side-arms, and lens elements, which may be similar to those described above in connection with FIGS. 1A and 1B. The wearable computing device 202 may additionally include an on-board computing system 204 and a video camera 206, which may also be similar to those described above in connection with FIGS. 1A and 1B. The video camera 206 is shown mounted on a frame of the wearable computing device 202; however, the video camera 206 may be mounted at other positions as well.

As shown in FIG. 2, the wearable computing device 202 may include a single display 208 which may be coupled to the device. The display 208 may be similar to the display described above in connection with FIGS. 1A and 1B. The display 208 may be formed on one of the lens elements of the wearable computing device 202, and may be configured to overlay images and/or graphics (e.g., a user-interface) on the user's view of the physical world. The display 208 is shown to be provided in a center of a lens of the wearable computing device 202; however, the display 208 may be provided in other positions. The display 208 is controllable via the computing system 204 that is coupled to the display 208 via an optical waveguide 210.

Figure 3:
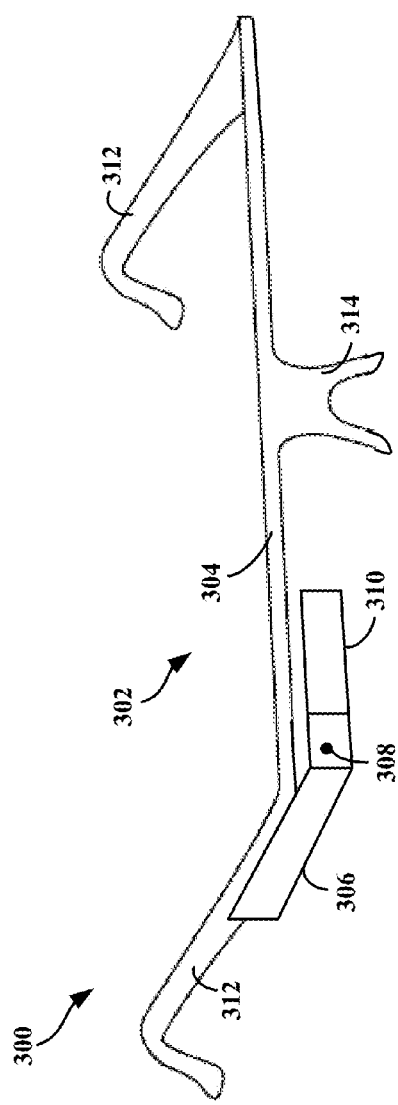
FIG. 3 illustrates another example system for receiving, transmitting, and displaying data, in accordance with an embodiment.

FIG. 3 illustrates another example system 300 for receiving, transmitting, and displaying data, in accordance with an embodiment. The system 300 is shown in the form of a wearable computing device 302. The wearable computing device 302 may include side-arms 312, a center frame support 304, and a bridge portion with nosepiece 314. In the example shown in FIG. 3, the center frame support 304 connects the side-arms 312. The wearable computing device 302 does not include lens-frames containing lens elements. The wearable computing device 302 may additionally include an on-board computing system 306 and a video camera 308, which may be similar to those described above in connection with FIGS. 1A and 1B. The wearable computing device 302 may include a single lens element 310 that may be coupled to one of the side-arms 312 or the center frame support 304. The lens element 310 may include a display, which may be similar to the display described above in connection with FIGS. 1A and 1B, and may be configured to overlay images and/or graphics (e.g., a user-interface) upon the user's view of the physical world. In one example, the single lens element 310 may be coupled to a side of the extending side-arm 312. The single lens element 310 may be positioned in front of or proximate to a user's eye when the wearable computing device 302 is worn by a user. For example, the single lens element 310 may be positioned below the center frame support 304, as shown in FIG. 3.

In some embodiments, a wearable computing device (such as any of the wearable computing devices 102, 202, and 302 described above) may be configured to operate in a computer network structure. To this end, the wearable computing device may be configured to connect to one or more remote devices using a communication link or links.

The remote device(s) may be any type of computing device or transmitter, such as, for example, a laptop computer, a mobile telephone, or tablet computing device, etc., that is configured to transmit data to the wearable computing device. The wearable computing device may be configured to receive the data and, in some cases, provide a display that is based at least in part on the data.

The remote device(s) and the wearable computing device may each include hardware to enable the communication link(s), such as processors, transmitters, receivers, antennas, etc. The communication link(s) may be a wired or a wireless connection. For example, the communication link may be a wired serial bus, such as a universal serial bus or a parallel bus, among other connections. As another example, the communication link may be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device(s) may be accessible via the Internet and may include a computing cluster associated with a particular web service (e.g., social-networking, photo sharing, address book, etc.).

Figure 4:
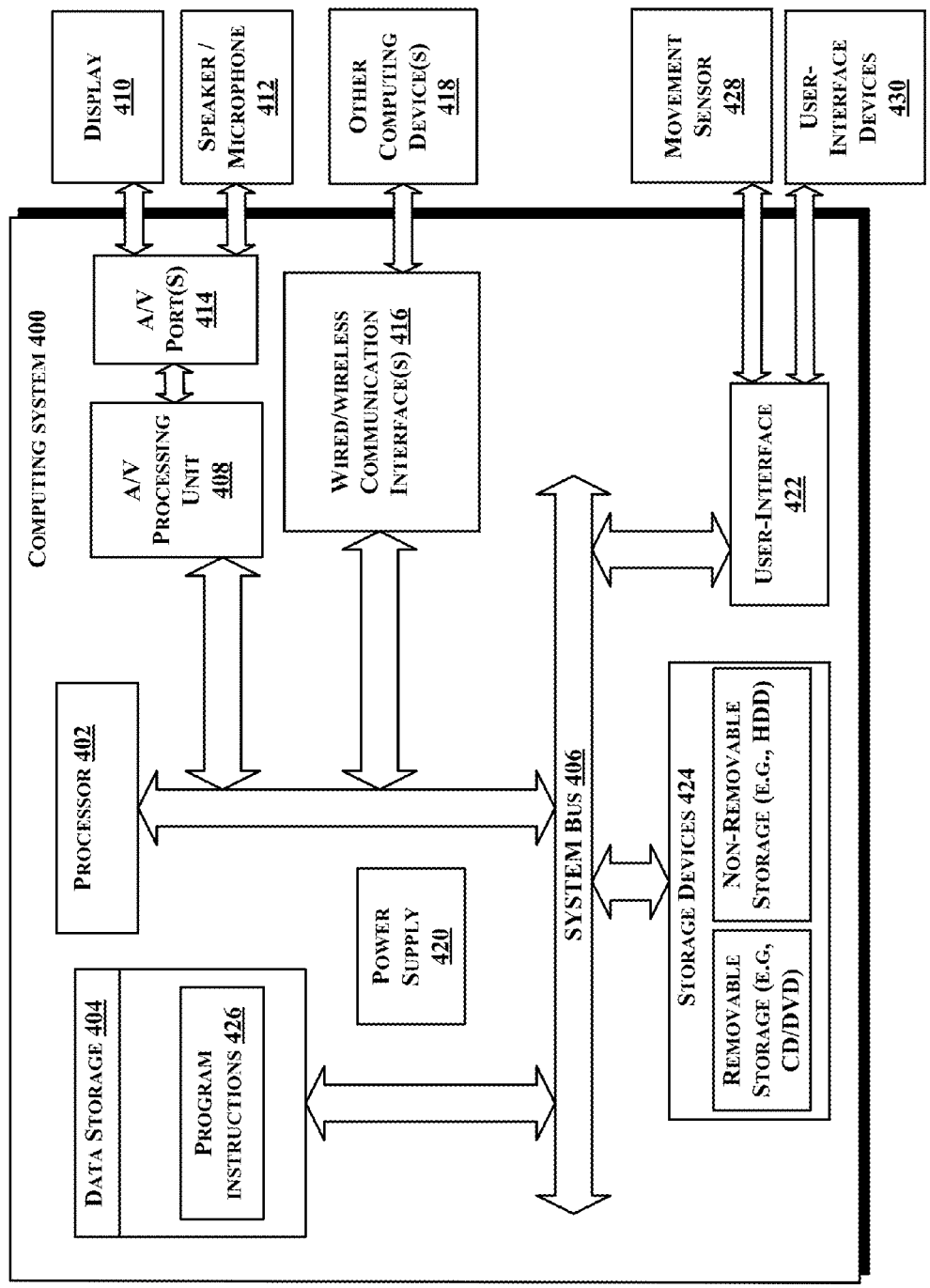
FIG. 4 shows a simplified block diagram depicting example components of an example computing system, in accordance with an embodiment.

As described above in connection with FIGS. 1A-3, an example wearable computing device may include, or may otherwise be communicatively coupled to, a computing system, such as computing system 118, computing system 204, or computing system 306. FIG. 4 shows a simplified block diagram depicting example components of an example computing system 400, in accordance with an embodiment.

Computing system 400 may include at least one processor 402 and data storage 404. Further, in some embodiments, computing system 400 may include a system bus 406 that communicatively connects the processor 402 and the data storage 404, as well as other components of computing system 400.

Depending on the desired configuration, the processor 402 may be any type of processor including, but not limited to, a microprocessor (µP), a microcontroller (µC), a digital signal processor (DSP), or any combination thereof. Furthermore, data storage 404 can be of any type of memory now known or later developed including but not limited to volatile memory (such as RAM), non-volatile memory (such as ROM, flash memory, etc.) or any combination thereof.

The computing system 400 may include various other components as well. As shown, computing system 400 includes an A/V processing unit 408 for controlling a display 410 and a speaker/microphone 412 (via A/V port 414), one or more communication interfaces 416 for connecting to other computing devices 418, and a power supply 420.

The user-interface module 422 may be configured to provide one or more interfaces, including, for example, any of the user-interfaces described below in connection with FIGS. 5A-E. Display 410 may be arranged to provide a visual depiction of the user-interface(s) provided by the user-interface module 422.

User-interface module 422 may be further configured to receive data from and transmit data to (or be otherwise compatible with) a movement sensor 428 and one or more other user-interface devices 428.

The movement sensor 428 may comprise one or both of an accelerometer and a gyroscope, and may be configured to detect upward movement of the wearable computing device. In some embodiments, the movement sensor 428 may be configured to detect an upward angular velocity of the upward movement. Further, in some embodiments, the movement sensor 428 may be configured to detect non-upward movement of the wearable computing device and, in some embodiments, may be further configured to detect a non-upward angular velocity of the non-upward movement.

The other user-interface devices 428 may include, for example, one or more cameras or detectors, one or more sensors, and/or a finger-operable touch pad, which may be included in the computing system 400, similar to those described above in connection with FIG. 1A, or may be included in one or more peripheral devices that may be connected to the computing system. Other user-interface devices 428 are possible as well.

Furthermore, computing system 400 may also include one or more data storage devices 424, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 400.

Figure 7:
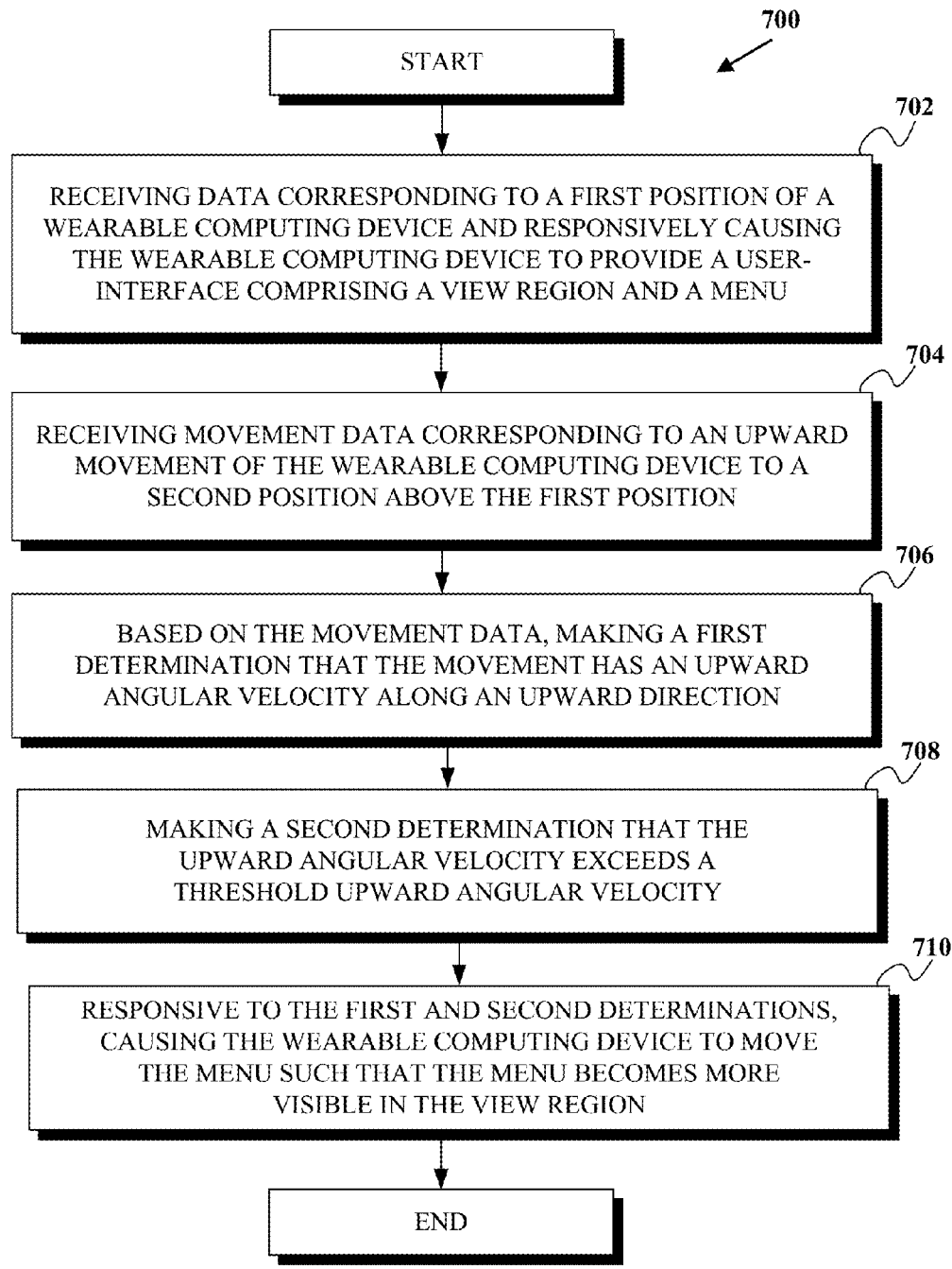
FIG. 7 shows a flowchart depicting an example method for providing a user-interface, in accordance with an embodiment.

According to an example embodiment, computing system 400 may include program instructions 426 that are stored in the data storage 404 (and/or possibly in another data-storage medium) and executable by processor 402 to facilitate the various functions described herein including, but not limited to, those functions described with respect to FIG. 7. In some embodiments, data storage 404 may further include a threshold upward angular velocity. Further, in some embodiments, data storage 404 may include a threshold non-upward angular velocity. Data storage 404 may include additional information as well.

Although various components of computing system 400 are shown as distributed components, it should be understood that any of such components may be physically integrated and/or distributed according to the desired configuration of the computing system.

3. Example User-Interface

FIGS. 5A-E show aspects of an example user-interface 500, in accordance with an embodiment. The user-interface 500 may be displayed by, for example, a wearable computing device, such as any of the wearable computing devices described above.

An example state of the user-interface 500 is shown in FIG. 5A. The example state shown in FIG. 5A may correspond to a first position of the wearable computing device. That is, the user-interface 500 may be displayed as shown in FIG. 5A when the wearable computing device is in the first position. In some embodiments, the first position of the wearable computing device may correspond to a position of the wearable computing device when a user of the wearable computing device is looking in a direction that is generally parallel to the ground (e.g., a position that does not correspond to the user looking up or looking down). Other examples are possible as well.

As shown, the user-interface 500 includes a view region 502. An example boundary of the view region 502 is shown by a dotted frame. While the view region 502 is shown to have a landscape shape (in which the view region 502 is wider than it is tall), in other embodiments the view region 502 may have a portrait or square shape, or may have a non-rectangular shape, such as a circular or elliptical shape. The view region 502 may have other shapes as well.

The view region 502 may be, for example, the viewable area between (or encompassing) the upper, lower, left, and right boundaries of a display on the wearable computing device. The view region 502 may thus be said to substantially fill a field of view of the wearable computing device.

As shown, when the wearable computing device is in the first position, the view region 502 is substantially empty (e.g., completely empty) of user-interface elements, such that the user's view of the user's real-world environment is generally uncluttered, and objects in the user's environment are not obscured.

In some embodiments, the view region 502 may correspond to a field of view of a user of the wearable computing device, and an area outside the view region 502 may correspond to an area outside the field of view of the user. In other embodiments, the view region 502 may correspond to a non-peripheral portion of a field of view of a user of the wearable computing device, and an area outside the view region 502 may correspond to a peripheral portion of the field of view of the user. In still other embodiments, the user-interface 500 may be larger than or substantially the same as a field of view of a user of the wearable computing device, and the field of view of the user may be larger than or substantially the same size as the view region 502. The view region 502 may take other forms as well.

Accordingly, the portions of the user-interface 500 outside of the view region 502 may be outside of or in a peripheral portion of a field of view of a user of the wearable computing device. For example, as shown, a menu 504 may be outside of or in a peripheral portion of the field of view of the user in the user-interface 500. In particular, the menu 504 is shown to be located above the view region. While the menu 504 is shown to be not visible in the view region 502, in some embodiments the menu 504 may be partially visible in the view region 502. In general, however, when the wearable computing device is in the first position, the menu 504 may not be fully visible in the view region.

In some embodiments, the wearable computing device may be configured to receive movement data corresponding to, for example, an upward movement of the wearable computing device to a second position above the first position. Further, the wearable computing device may be configured to make a first determination that the upward movement has an upward angular velocity along an upward direction. The upward angular velocity may take any of the forms described above. The wearable computing device may then compare the upward angular velocity to a threshold upward angular velocity in order to make a second determination that the upward angular velocity exceeds the threshold upward angular velocity. The threshold upward angular velocity may take any of the forms described above.

Responsive to the first and second determinations, the wearable computing device may cause one or both of the view region 502 and the menu 504 to move such that the menu 504 becomes more visible in the view region 502. For example, the wearable computing device may cause the view region 502 to move upward and/or may cause the menu 504 to move downward. The view region 502 and the menu 504 may move the same amount, or may move different amounts. In one embodiment, the menu 504 may move further than the view region 502. As another example, the wearable computing device may cause only the menu 504 to move. Other examples are possible as well.

In some embodiments, when the view region 502 moves, the view region 502 may appear to a user of the wearable computing device as if mapped onto the inside of a static sphere centered at the wearable computing device, and a scrolling or panning movement of the view region 502 may map onto movement of the real-world environment relative to the wearable computing device. The view region 502 may move in other manners as well.

In some embodiments, "upward" may refer to an upward movement in the reference frame of a user of the wearable computing device. Other reference frames are possible as well. In embodiments where the wearable computing device is a head-mounted device, the upward movement of the wearable computing device may also be an upward movement of a user's head such as, for example, the user looking upward.

The movement data corresponding to the upward movement may take several forms. For example, the movement data may be (or may be derived from) data received from one or more movement sensors, accelerometers, and/or gyroscopes configured to detect the upward movement, such as the movement sensor 428 described above in connection with FIG. 4. The one or more movement sensors may be included in the wearable computing device or may be included in a peripheral device communicatively coupled to the wearable computing device. As another example, the movement data may be (or may be derived from) data received from a touch pad, such as the finger-operable touch pad 124 described above in connection with FIG. 1A, or other input device included in or coupled to the wearable computing device and configured to detect one or more predetermined movements. In some embodiments, the movement data may comprise an indication of an upward angular velocity of the movement. In other embodiments, the upward angular velocity of the movement may be derivable from the movement data. For example, the movement data may comprise indications of an angle of rotation of the upward movement and a time period of the upward movement. The movement data may take other forms as well.

Figure 5B:
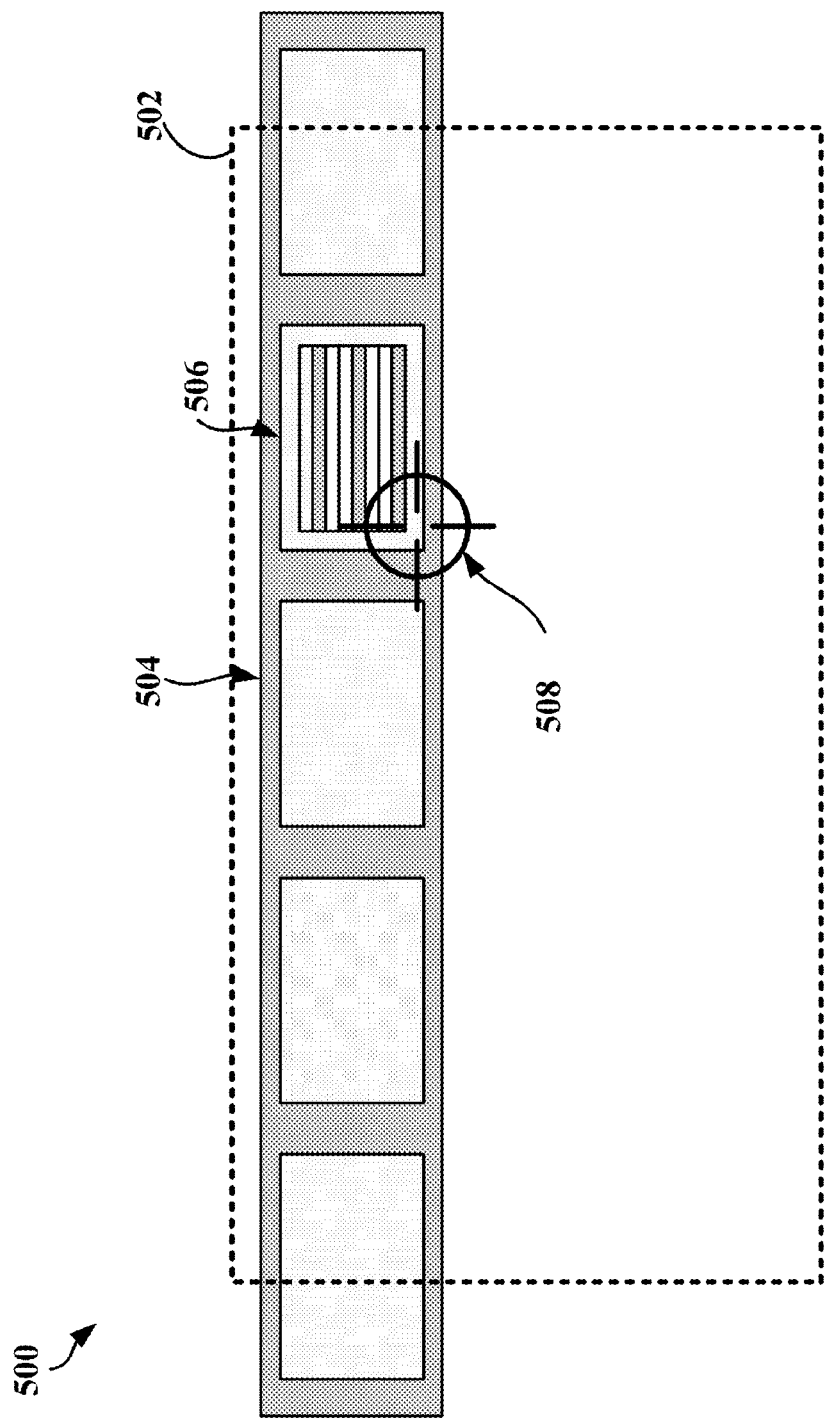
FIG. 5B shows aspects of an example user-interface after receiving movement data corresponding to an upward movement having an upward angular velocity that exceeds a threshold angular velocity, in accordance with an embodiment.

FIG. 5B shows aspects of an example user-interface 500 after receiving movement data corresponding to an upward movement having an upward angular velocity that exceeds a threshold upward angular velocity, in accordance with an embodiment. As shown, the user-interface 500 includes the view region 502 and the menu 504.

As noted above, in response to receiving the movement data corresponding to an upward movement of the wearable computing device and determining that an upward angular velocity of the upward movement exceeds a threshold upward angular velocity, the wearable computing device may move one or both of the view region 502 and the menu 504 such that the menu 504 becomes more visible in the view region 502. The view region and/or the menu 504 may be moved in several manners.

In some embodiments, the view region 502 and/or the menu 504 may be moved in a scrolling, panning, sliding, dropping, and/or jumping motion. For example, as the view region 502 moves upward, the menu 504 may scroll or pan into view. In some embodiments, when the view region 502 moves back downward, the menu 504 may be "pulled" downward as well, and may remain in the view region 502. As another example, as the view region 502 moves upward, the menu 504 may appear to a user of the wearable computing device to slide or drop downward into the view region 502. Other examples are possible as well.

In some embodiments, a magnitude, speed, acceleration, and/or direction of the scrolling, panning, sliding, and/or dropping may be based at least in part on a magnitude, speed, acceleration, and/or direction of the upward movement. For example, the wearable computing device may move the view region 502 and/or the menu 504 at a rate based on the upward angular velocity. Other examples are possible as well. The view region 502 and/or the menu 504 may be moved in other manners as well.

While the foregoing description focused on upward movement, it is to be understood that the wearable computing device could be configured to receive data corresponding to other directional movement (e.g., downward, leftward, rightward, etc.) as well, and that the view region 502 may be moved in response to receiving such data in a manner similar to that described above in connection with upward movement. In these embodiments, rather than being positioned above the view region 502, the menu 504 may be positioned outside the view region 502 in other directions (e.g., below, to the left of, to the right of, etc.) For example, the menu 504 may be positioned to the left of the view region 502. The wearable computing device may be configured to receive data corresponding to a leftward movement, and the view region 502 may be moved leftward (or the menu 504 may be moved rightward), such that the menu 504 becomes more visible in the view region 502. Other examples are possible as well.

In some embodiments, a user of the wearable computing device need not keep the wearable computing device at the second position to keep the menu 504 at least partially visible in the view region 502. Rather, the user may return the wearable computing device to a more comfortable position (e.g., at or near the first position), and the wearable computing device may move the menu 504 and the view region 502 substantially together, thereby keeping the menu 504 at least partially visible in the view region 502. In this manner, the user may continue to interact with the menu 504 even after moving the wearable computing device to what may be a more comfortable position.

As shown, the menu 504 includes a number of menu objects 506. In some embodiments, the menu objects 506 may be arranged in a ring (or partial ring) above or at/near the top of the view region 502. Alternately or additionally, the menu objects 506 may be arranged in a ring (or partial ring) around and above the head of a user of the wearable computing device. In other embodiments, the menu objects 506 may be arranged in a dome-shape above the user's head. The ring or dome may be centered above the wearable computing device and/or the user's head. In other embodiments, the menu objects 506 may be arranged in other ways as well.

The number of menu objects 506 in the menu 504 may be fixed or may be variable. In embodiments where the number is variable, the menu objects 506 may vary in size according to the number of menu objects 506 in the menu 504.

Depending on the application of the wearable computing device, the menu objects 506 may take several forms. For example, the menu objects 506 may include one or more of people, contacts, groups of people and/or contacts, calendar items, lists, notifications, alarms, reminders, status updates, incoming messages, recorded media, audio recordings, video recordings, photographs, digital collages, previously-saved states, webpages, applications, and shortcuts (e.g., to control the behavior of one or more applications running the foreground or the background, such as a play shortcut, a pause shortcut, a home screen shortcut, a close shortcut, an end shortcut, etc.) or to control one or more parameters on the wearable computing device (such as a shortcut to turn on/off WiFi, a shortcut to turn on/off vibrate, and a shortcut to adjust volume, etc.), as well as tools for controlling or accessing one or more devices, such as a still camera, a video camera, and/or an audio recorder. Menu objects 506 may take other forms as well.

In embodiments where the menu objects 506 include tools, the tools may be located in a particular region of the menu 504, such as the center. In some embodiments, the tools may remain in the center of the menu 504, even if the other menu objects 506 rotate, as described above. Tool menu objects may be located in other regions of the menu 504 as well.

The particular menu objects 506 that are included in menu 504 may be fixed or variable. For example, the menu objects 506 may be preselected by a user of the wearable computing device. In another embodiment, the menu objects 506 may be automatically assembled by the wearable computing device from one or more physical or digital contexts including, for example, people, places, and/or objects surrounding the wearable computing device, address books, calendars, social-networking web services or applications, photo sharing web services or applications, search histories, and/or other contexts. Further, some menu objects 506 may be fixed, while other menu objects 506 may be variable. The menu objects 506 may be selected in other manners as well.

Similarly, an order or configuration in which the menu objects 506 are displayed may be fixed or variable. In one embodiment, the menu objects 506 may be pre-ordered by a user of the wearable computing device. In another embodiment, the menu objects 506 may be automatically ordered based on, for example, how often each menu object 506 is used (on the wearable computing device only or in other contexts as well), how recently each menu object 506 was used (on the wearable computing device only or in other contexts as well), an explicit or implicit importance or priority ranking of the menu objects 506, and/or other criteria.

As shown in FIG. 5B, only a portion of the menu 504 is visible in the view region 502. In particular, while the menu 504 is vertically inside the view region 502, the menu 504 extends horizontally beyond the view region 502 such that a portion of the menu 504 is outside the view region 502. As a result, one or more menu objects 506 may be only partially visible in the view region 502, or may not be visible in the view region 502 at all. In particular, in embodiments where the menu objects 506 extend circularly around a user's head, like a ring (or partial ring), a number of the menu objects 506 may be outside the view region 502.

In order to view menu objects 506 located outside the view region 506, a user of the wearable computing device may interact with the wearable computing device to, for example, pan or rotate the menu objects 506 along a path (e.g., left or right, clockwise or counterclockwise) around the user's head. To this end, the wearable computing device may, in some embodiments, be configured to receive panning data indicating a direction.

The panning data may take several forms. For example, the panning data may be (or may be derived from) data received from one or more movement sensors, accelerometers, gyroscopes, and/or detectors configured to detect one or more predetermined movements. The one or more movement sensors may be included in the wearable computing device, like the sensor 122, or may be included in a peripheral device communicatively coupled to the wearable computing device. As another example, the panning data may be (or may be derived from) data received from a touch pad, such as the finger-operable touch pad 124 described above in connection with FIG. 1A, or other input device included in or coupled to the wearable computing device and configured to detect one or more predetermined movements. In some embodiments, the panning data may take the form of a binary indication corresponding to the predetermined movement. In other embodiments, the panning data may comprise an indication corresponding to the predetermined movement as well as an extent of the predetermined movement, such as a magnitude, speed, and/or acceleration of the predetermined movement. The panning data may take other forms as well.

The predetermined movements may take several forms. In some embodiments, the predetermined movements may be certain movements or sequence of movements of the wearable computing device or peripheral device. In some embodiments, the predetermined movements may include one or more predetermined movements defined as no or substantially no movement, such as no or substantially no movement for a predetermined period of time. In embodiments where the wearable computing device is a head-mounted device, one or more predetermined movements may involve a predetermined movement of the user's head that moves the wearable computing device in a corresponding manner. Alternatively or additionally, the predetermined movements may involve a predetermined movement of a peripheral device communicatively coupled to the wearable computing device. The peripheral device may similarly be wearable by a user of the wearable computing device, such that the movement of the peripheral device may follow a movement of the user, such as, for example, a movement of the user's hand. Still alternatively or additionally, one or more predetermined movements may be, for example, a movement across a finger-operable touch pad or other input device. Other predetermined movements are possible as well.

In these embodiments, in response to receiving the panning data, the wearable computing device may move the menu based on the direction, such that the portion of the menu moves insides the view region.

Figure 5C:
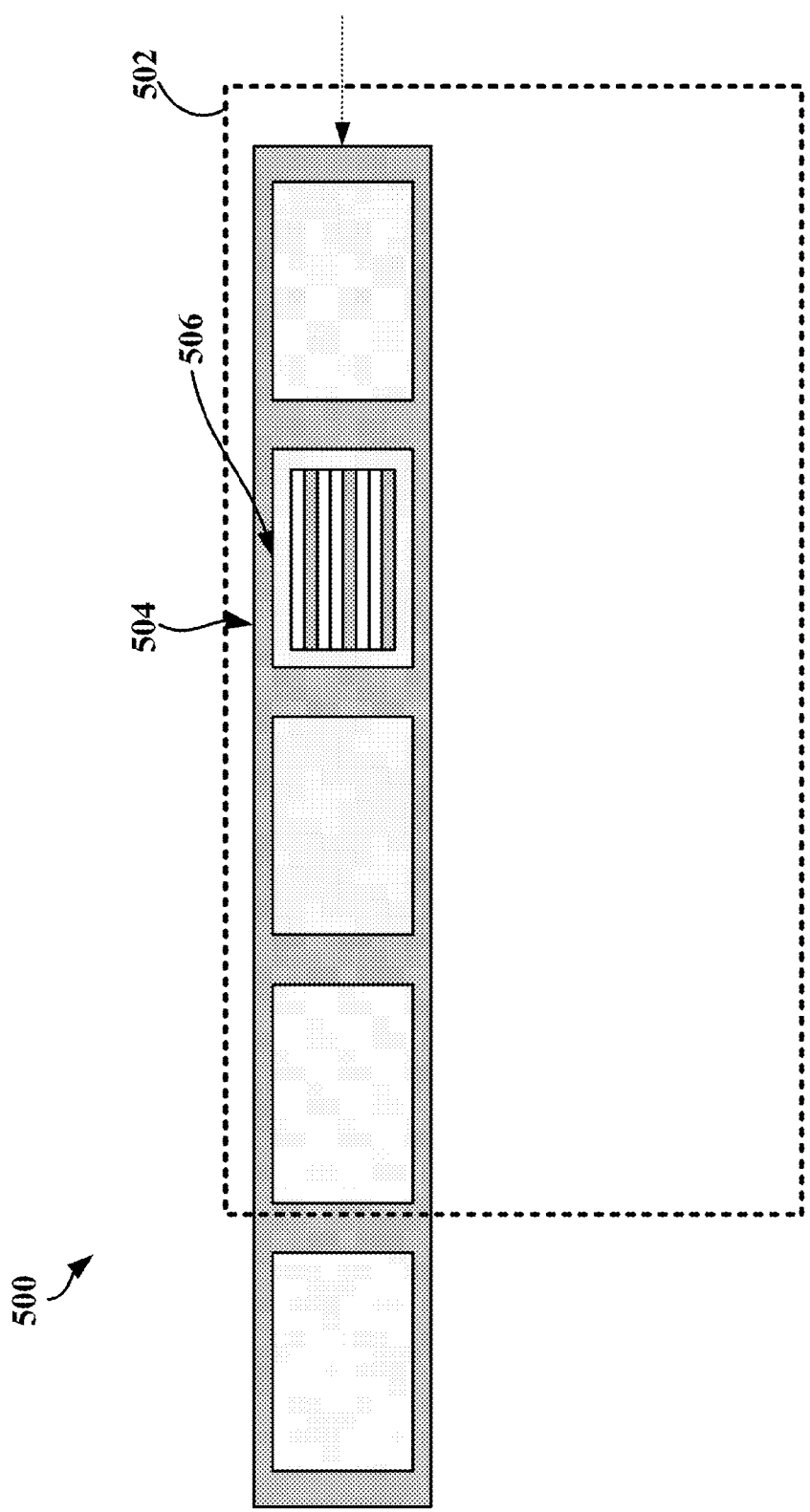
FIG. 5C shows aspects of an example user-interface after receiving panning data indicating a direction, in accordance with an embodiment.

FIG. 5C shows aspects of an example user-interface 500 after receiving panning data indicating a direction, in accordance with an embodiment. As indicated by the dotted arrow, the menu 504 has been moved. To this end, the panning data may have indicated, for example, that the user turned the user's head to the right, and the wearable computing device may have responsively panned the menu 504 to the left. Alternately, the panning data may have indicated, for example, that the user tilted the user's head to the left, and the wearable computing device may have responsively rotated the menu 504 in a counterclockwise direction. Other examples are possible as well.

While the menu 504 is shown to extend horizontally beyond the view region 502, in some embodiments the menu 504 may be fully visible in the view region 502.

Returning to FIG. 5B, in some embodiments, the wearable computing device may be further configured to receive from the user a selection of a menu object 506 from the menu 504. To this end, the user-interface 500 may include a cursor 508, shown in FIG. 5B as a reticle, which may navigated around the view region 502 to select menu objects 506 from the menu 504. Alternatively, the cursor 508 may be "locked" in the center of the view region 502, and the menu 504 may be static. Then, the view region 502, along with the locked cursor 508, may be navigated over the static menu 504 to select menu objects 506 from the menu 504. In some embodiments, the cursor 508 may be controlled by a user of the wearable computing device through one or more predetermined movements. The cursor 508 may always be present on the device, or may become visible only at certain times, such as when the menu 504 becomes more visible in the view region 502. Accordingly, the wearable computing device may be further configured to receive selection data corresponding to the one or more predetermined movements. The selection data may take any of the forms described above in connection with the panning data.

As shown, a user of the wearable computing device has navigated the cursor 508 to the menu object 506 using one or more predetermined movements. In order to select the menu object 506, the user may perform an additional predetermined movement, such as holding the cursor 508 over the menu object 506 for a predetermined period of time. The user may select the menu object 506 in other manners as well.

In some embodiments, the menu 504, one or more menu objects 506, and/or other objects in the user-interface 500 may function as "gravity wells," such that when the cursor 508 is within a predetermined distance of the object, the cursor 508 is drawn towards the object by "gravity." Additionally, the cursor 508 may remain on the object until a predetermined movement having a magnitude, speed, and/or acceleration greater than a predetermined threshold is detected. In this manner, a user may more easily navigate the cursor 508 to the object and hold the cursor 508 over the object so as to select the object.

Figure 5D:
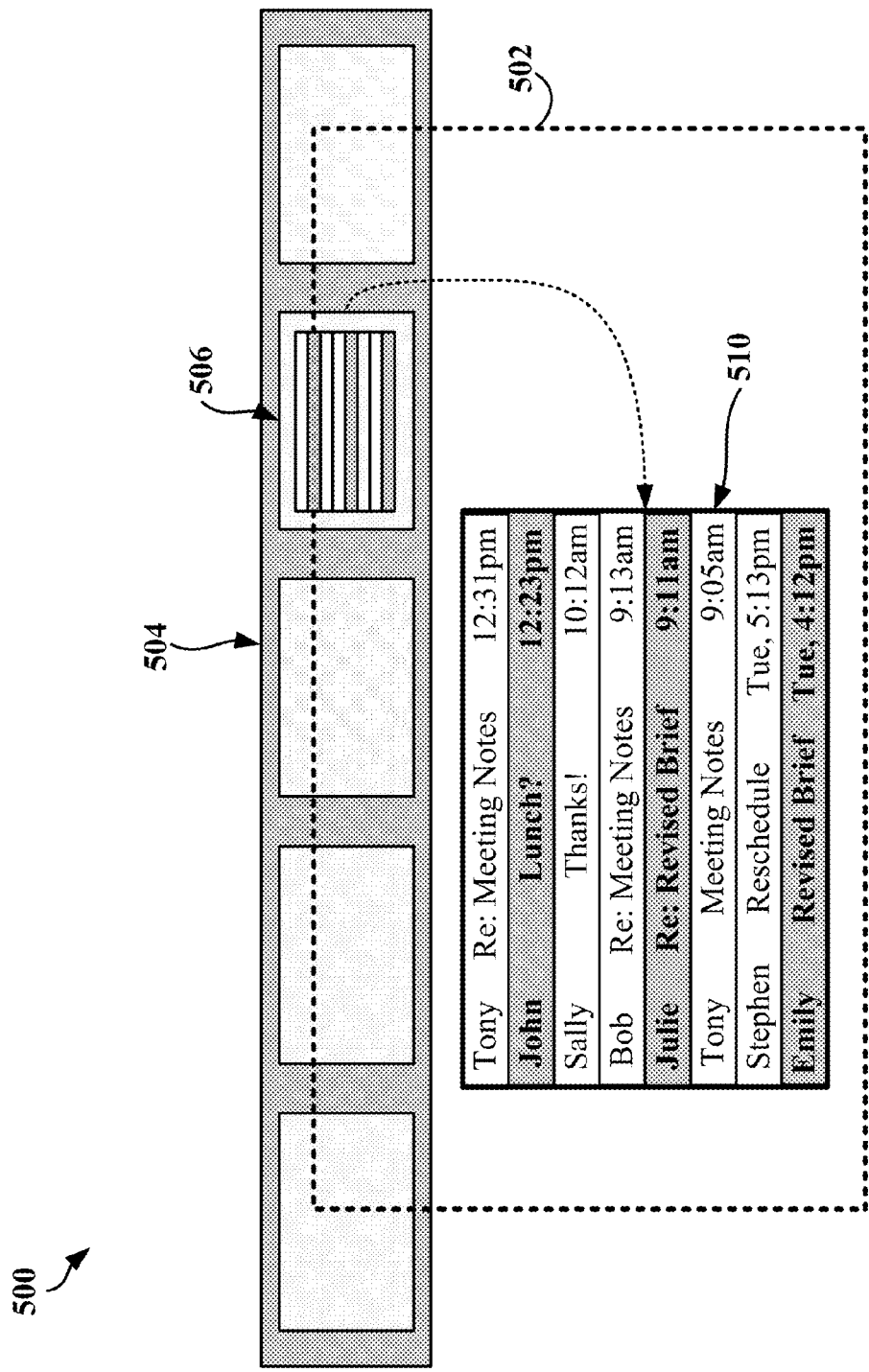
FIG. 5D shows aspects of an example user-interface after receiving selection data indicating selection of a selected menu object, in accordance with an embodiment.

Once a menu object 506 is selected, the wearable computing device may cause the menu object 506 to be displayed in the view region 502 as a selected menu object. FIG. 5D shows aspects of an example user-interface 500 after receiving selection data indicating selection of a selected menu object 510, in accordance with an embodiment.

As indicated by the dotted arrow, the menu object 506 is displayed in the view region 502 as a selected menu object 510. As shown, the selected menu object 510 is displayed larger and in more detail in the view region 502 than in the menu 504. In other embodiments, however, the selected menu object 510 could be displayed in the view region 502 smaller than or the same size as, and in less detail than or the same detail as, the menu 504. In some embodiments, additional content (e.g., actions to be applied to, with, or based on the selected menu object 510, information related to the selected menu object 510, and/or modifiable options, preferences, or parameters for the selected menu object 510, etc.) may be showed adjacent to or nearby the selected menu object 510 in the view region 502.

Once the selected menu object 510 is displayed in the view region 502, a user of the wearable computing device may interact with the selected menu object 510. For example, as the selected menu object 510 is shown as an email inbox, the user may select one of the emails in the email inbox to read. Depending on the selected menu object, the user may interact with the selected menu object in other ways as well (e.g., the user may locate additional information related to the selected menu object 510, modify, augment, and/or delete the selected menu object 510, etc.). To this end, the wearable computing device may be further configured to receive input data corresponding to one or more predetermined movements indicating interactions with the user-interface 500. The input data may take any of the forms described above in connection with the movement data and/or the selection data.

Figure 5E:
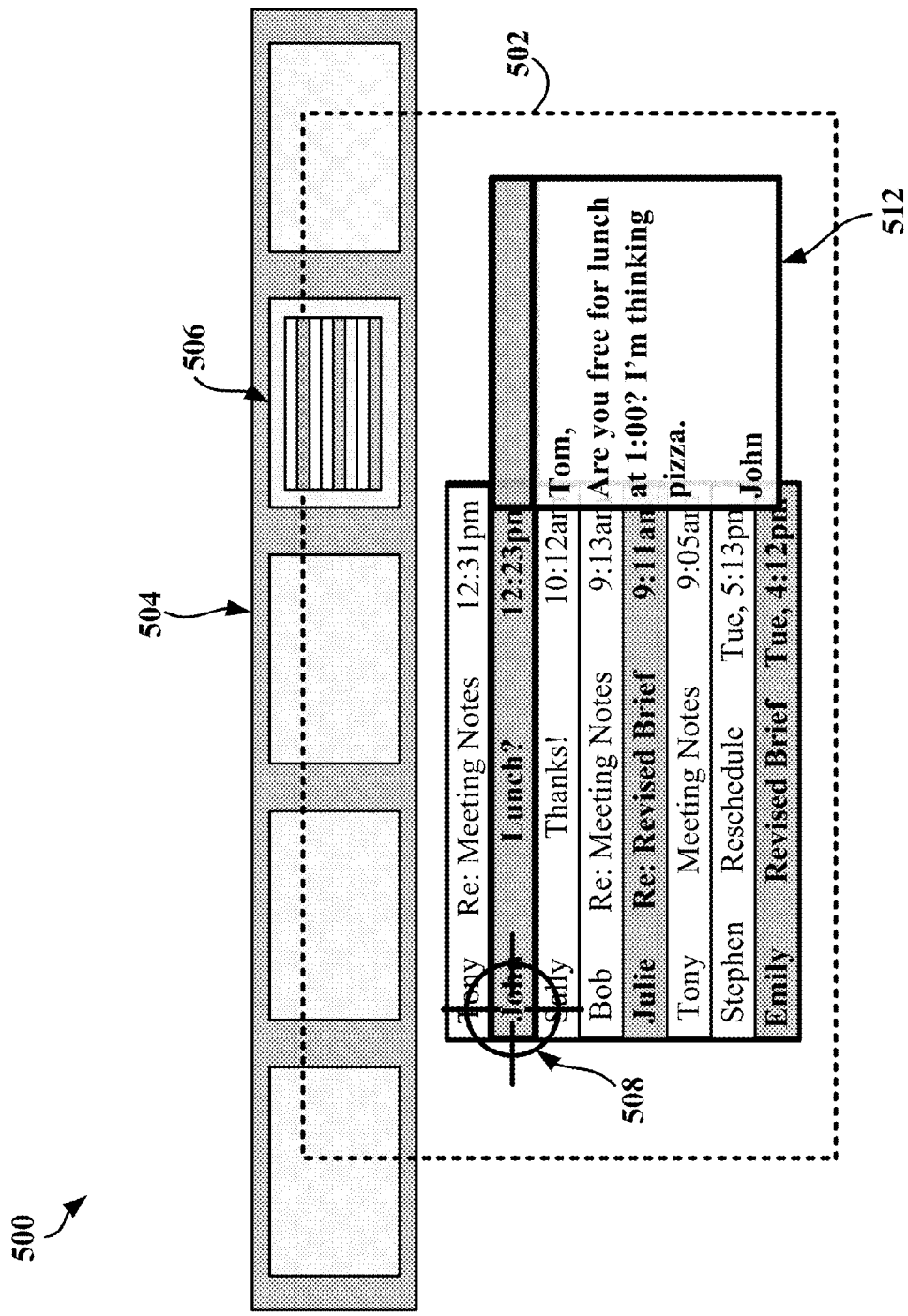
FIG. 5E shows aspects of an example user-interface after receiving input data corresponding to a user input, in accordance with an embodiment.

FIG. 5E shows aspects of an example user-interface 500 after receiving input data corresponding to a user input, in accordance with an embodiment. As shown, a user of the wearable computing device has navigated the cursor 508 to a particular subject line in the email inbox and selected the subject line. As a result, the email 512 is displayed in the view region, so that the user may read the email 512. The user may interact with the user-interface 500 in other manners as well, depending on, for example, the selected menu object.

While provided in the view region 502, the selected menu object 510 and any objects associated with the selected menu object 510 (e.g., the email 512) may be "locked" to the center of the view region 502. That is, if the view region 502 moves for any reason (e.g., in response to movement of the wearable computing device), the selected menu object 510 and any objects associated with the selected menu object 510 may remain locked in the center of the view region 502, such that the selected menu object 510 and any objects associated with the selected menu object 510 appear to a user of the wearable computing device not to move. This may make it easier for a user of the wearable computing device to interact with the selected menu object 510 and any objects associated with the selected menu object 510, even while the wearer and/or the wearable computing device are moving.

In some embodiments, the wearable computing device may be further configured to receive a request to remove the menu 504 from the view region 502. The request may take several forms.

In some embodiments, the request may take the form of a time out. To this end, the wearable computing device may be further configured to detect when a predetermined amount of time of inactivity has passed, and, in response to the detection, may remove the menu 504 from the view region.

In other embodiments, the request may take the form of a request from the user. The user may indicate the request by, for example, selecting a "close" option from the menu 504 and/or by selecting an object or application outside the menu 504. To this end, the wearable computing device may be further configured to detect when a request has been indicated by the user and, in response to the detection, may remove the menu 504 from the view region 502.

In still other embodiments, the request may take the form of removal data corresponding to one or more predetermined movements. The removal data may take any of the forms described above in connection with the movement data and/or panning data. For example, the removal data may correspond to a repeated movement of the wearable computing device from the left to the right, as if a user of the wearable computing device is shaking his or her head. As another example, the removal data may correspond to a movement detected by the wearable computing device or by a peripheral device connected to the wearable computing device, such as a movement of a user's hand detected by, e.g., a proximity sensor, or a movement across a touchpad. As still another example, the removal data may correspond to a movement having an angular velocity (e.g., a downward angular velocity) that exceeds a threshold angular velocity. Other examples are possible as well.

Once the menu 504 is removed from the view region 502, the user-interface 500 may again appear as shown in FIG. 5A.

4. Example Implementation

Several example user-interfaces have been described. It is to be understood that each of the above-described user-interfaces is merely an exemplary state of the disclosed user-interface, and that the user-interface may move between the above-described and other states according to one or more types of user input to the wearable computing device and/or the user-interface. That is, the disclosed user-interface is not a static user-interface, but rather is a dynamic user-interface configured to move between several states. Movement between states of the user-interface is described in connection with FIGS. 6A and 6B, which show an example implementation of an example user-interface, in accordance with an embodiment.

Figure 6A:
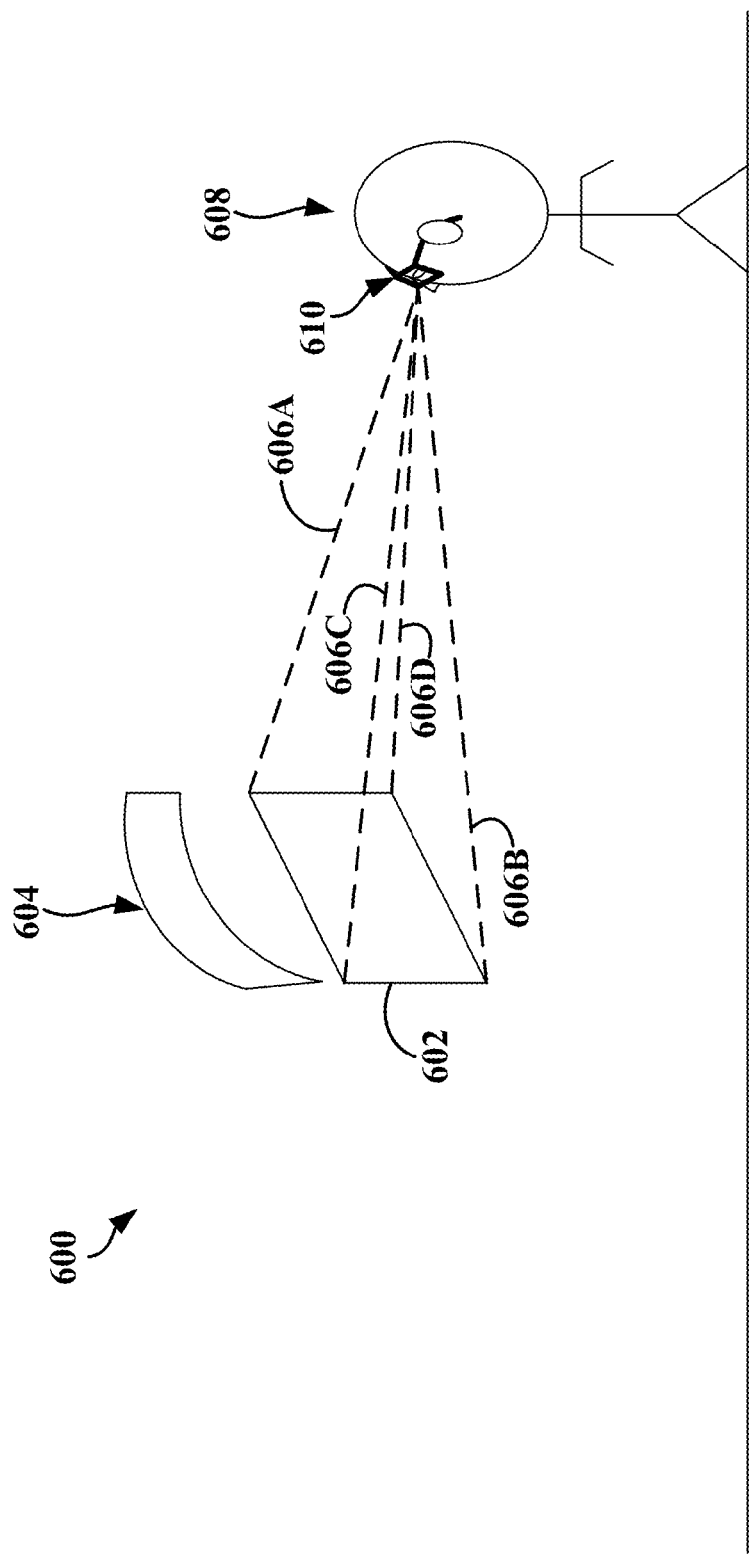
FIG. 6A shows an example implementation of an example user-interface on an example wearable computing device when the wearable computing device is at a first position, in accordance with an embodiment.

FIG. 6A shows an example implementation of an example user-interface on an example wearable computing device 610 when the wearable computing device 610 is at a first position, in accordance with an embodiment. As shown in FIG. 6A, a user 608 wears a wearable computing device 610. In response to receiving data corresponding to a first position of the wearable computing device 610 (e.g., a position of the wearable computing device 610 when the user 608 is looking in a direction that is generally parallel to the ground, or another comfortable position), the wearable computing device 610 provides a first state 600 of a user-interface, which includes a view region 602 and a menu 604.

Example boundaries of the view region 602 are shown by the dotted lines 606A through 606D. The view region 602 may substantially fill a field of view of the wearable computing device 610 and/or the user 608.

As shown, in the first state 600, the view region 602 is substantially empty. Further, in the first state 600, the menu 604 is not fully visible in the view region 602 because some or all of the menu 604 is above the view region 602. As a result, the menu 604 is not fully visible to the user 608. For example, the menu 604 may be visible only in a periphery of the user 608, or may not be visible at all. Other examples are possible as well.

The menu 604 is shown to be arranged in a partial ring located above the view region 602. In some embodiments, the menu 604 may extend further around the user 608, forming a full ring. The (partial or full) ring of the menu 604 may be substantially centered over the wearable computing device 610 and/or the user 608.

At some point, the user 608 may cause an upward movement of the wearable computing device 610 by, for example, looking upward. As a result of the upward movement, the wearable computing device 610 may move from a first position to a second position above the first position. The wearable computing device 610 may receive movement data corresponding to the upward movement, and, based on the movement data, may determine an upward angular velocity along an upward direction. The upward angular velocity may take any of the forms described above. The wearable computing device 610 may further compare the upward angular velocity with a threshold upward angular velocity. The threshold upward angular velocity may similarly take any of the forms described above.

Figure 6B:
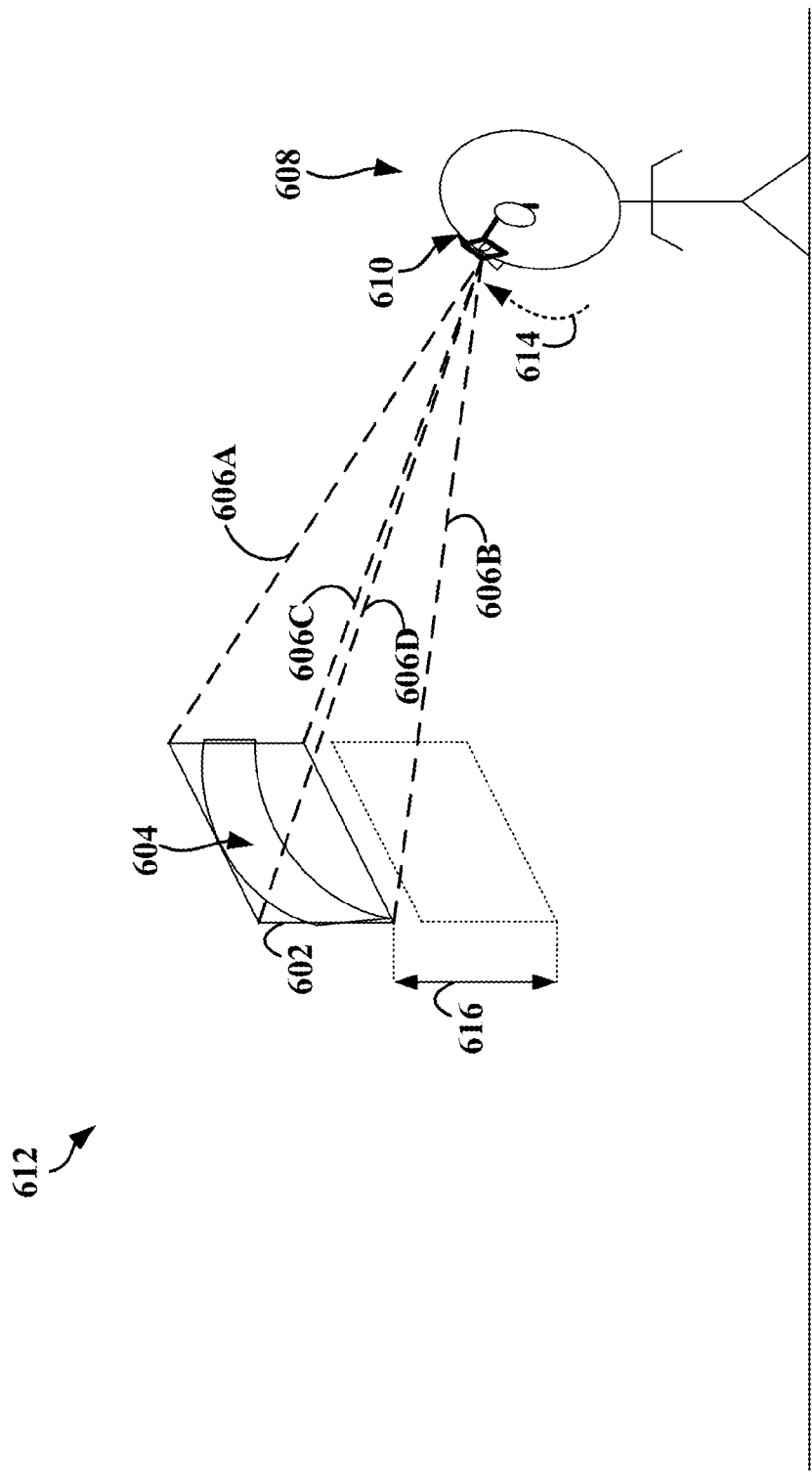
FIG. 6B shows an example implementation of an example user-interface on an example wearable computing device in response to detecting an upward movement having an upward angular velocity that exceeds a threshold angular velocity, in accordance with an embodiment.

FIG. 6B shows an example implementation of an example user-interface on an example wearable computing device in response to detecting an upward movement 614 having an upward angular velocity that exceeds a threshold angular velocity, in accordance with an embodiment.

In response to detecting the upward movement 614 upward movement 614 having an upward angular velocity that exceeds a threshold angular velocity, the wearable computing device 610 may provide a second state 612 of the user-interface. As shown, in the second state 612, the menu 604 is more visible in the view region 602, as compared with the first state 600. As shown, the menu 604 is substantially fully visible in the view region 602. In other embodiments, however, the menu 604 may be only partially visible in the view region 602.

As shown, the wearable computing device 610 provides the second state 612 by moving the view region 602 upward. In other embodiments, however, the wearable computing device 610 may provide the second state 612 by moving the menu 604 downward. In still other embodiments, the wearable computing device 610 may provide the second state 612 by moving the view region 602 upward and moving the menu 604 downwards.

While the menu 604 is visible in the view region 602, as shown in the state 612, the user 608 may interact with the menu 604, as described above.

It will be understood that movement between states of the user-interface may involve a movement of the view region 602 over a static menu 604 or, equivalently, a movement of the menu 604 and within a static view region 602. Alternately, movement between states of the user-interface may involve movement of both the view region 602 and the menu 604.

In some embodiments, movement between the states of the user-interface may be gradual and/or continuous. Alternately, movement between the states of the user-interface may be substantially instantaneous. In some embodiments, the view region 602 and/or the menu 604 may move at a rate based at least on the upward angular velocity of the upward movement 614. Further, in some embodiments, the view region 602 and/or the menu 604 may move a distance based at least on the upward angular velocity of the upward movement 614. For example, as shown, the view region 602 has moved upward a distance 616. The distance 616 may be determined by the wearable computing device 610 as a function of at least the upward angular velocity of the upward movement 614.

Movement between the states may take other forms as well.

5. Example Method

FIG. 7 shows a flowchart depicting an example method 700 for providing a user-interface, in accordance with an embodiment.

Method 700 shown in FIG. 7 presents an embodiment of a method that, for example, could be used with the systems and devices described herein. Method 700 may include one or more operations, functions, or actions as illustrated by one or more of blocks 702-710. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 700 and other processes and methods disclosed herein, each block may represent circuitry that is wired to perform the specific logical functions in the process.

As shown, the method 700 begins at block 702 where a wearable computing device receives data corresponding to a first position of the wearable computing device and responsively causes the wearable computing device to provide a user-interface that comprises a view region and a menu.

The wearable computing device may take any of the forms described above in connection with FIGS. 1A-4. In some embodiments, the wearable computing device may be a head-mounted device. Other wearable computing devices are possible as well.

The user-interface may, for example, appear similar to the user-interface 500 described above in connection with FIG. 5A. To this end, the view region may substantially fill a field of view of the wearable computing device. Further, the menu may not be fully visible in the view region. For example, the menu may not be visible in the view region at all. Still further, the view region may be substantially empty. In some embodiments, the menu may be located above the view region. For example, the menu may be arranged along an at least partial ring located above the view region. The at least partial ring may be centered over the wearable computing device. The user-interface may take other forms as well.

The method 700 continues at block 704 where the wearable computing device receives movement data corresponding to an upward movement of the wearable computing device to a second position above the first position. The movement data may take any of the forms described above.

The method 700 continues at block 706 where, based on the movement data, the wearable computing device makes a first determination that the movement has an upward angular velocity along an upward direction. The upward angular velocity may be, for example, a maximum upward angular velocity of the upward movement over a period of time, or may be an average upward angular velocity over a period of time. The upward angular velocity may take other forms as well. In some embodiments, the movement data may comprise an indication of an upward angular velocity of the movement. In other embodiments, the upward angular velocity of the movement may be derivable from the movement data. For example, the movement data may comprise indications of an angle of rotation of the upward movement and a time period of the upward movement. The movement data may take other forms as well.

At block 708, the wearable computing device makes a second determination that the upward angular velocity exceeds a threshold upward angular velocity. To this end, the wearable computing device may compare the upward angular velocity with the threshold upward angular velocity. The threshold upward angular velocity may, in some embodiments, be predetermined. For example, the threshold upward angular velocity may be predetermined based on one or more preferences of a user of the wearable computing device. In this example, the user may be able to adjust or vary the threshold upward angular velocity by modifying the preferences. As another example, the threshold upward angular velocity may be predetermined based on calibration data measured during calibration of the wearable computing device. As still another example, the threshold upward angular velocity may have a value that is preset by, for instance, a manufacturer of the device. The threshold upward angular velocity may take other forms as well.

The method 700 continues at block 710 where, responsive to the first and second determination, the wearable computing device moves the menu such that the menu becomes more visible in the view region. In some embodiments, the wearable computing device may move the menu at a rate based at least on the upward angular velocity. Further, in some embodiments, the wearable computing device may move the menu a distance based at least on the upward angular velocity. In some embodiments, the wearable computing device may move the view region instead of or in addition to moving the menu.

At block 710, the user-interface may, for example, appear similar to the user-interface 500 described above in connection with FIG. 5B. To this end, the menu may be at least partially, and in some cases fully, visible in the view region. In some embodiments, the menu may include a number of menu objects, as described above. Further, in some embodiments, the menu may extend horizontally beyond the view region such that a portion of the menu is outside the view region.

In some embodiments, in addition to determining that the upward angular velocity exceeds the threshold upward angular velocity, the wearable computing device may compare the upward angular velocity with a maximum upward angular velocity in order to make a third determination that the maximum upward angular velocity does not exceed the maximum upward angular velocity. The maximum upward angular velocity may take any of the forms described above in connection with the threshold upward angular velocity. In these embodiments, the wearable computing device may, at block 710, move the menu in response to the first, second, and third determinations. That is, the wearable computing device may only move the menu to become more visible in the view region in response to determining that the upward angular velocity both exceeds the threshold upward angular velocity and does not exceed the maximum upward angular velocity.

In some embodiments, the upward movement may not be uniformly upward. For example, the upward movement may encompass movement having a combination of moving, tilting, rotating, shifting, sliding, or other movement that results in a generally upward movement. In these embodiments, the wearable computing device may, prior to block 710, make a third determination that the upward movement has a non-upward angular velocity along a non-upward direction. The non-upward direction may be, for example, non-parallel to the upward direction. The wearable computing device may then make a fourth determination that the non-upward angular velocity does not exceed a threshold non-upward angular velocity. To this end, the wearable computing device may compare the non-upward angular velocity to a threshold non-upward angular velocity. The threshold non-upward angular velocity may take any of the forms described above in connection with the threshold upward angular velocity. In these embodiments, the wearable computing device may, at block 710, move the menu in response to the first, second, third, and fourth determinations. That is, the wearable computing device may only cause the menu to become more visible in the view region in response to determining that both the upward angular velocity exceeds a threshold upward angular velocity and the non-upward angular velocity does not exceed the threshold non-upward angular velocity.

In some embodiments, the wearable computing device may be further configured to receive panning data and responsively pan and/or rotate the menu, as described above. In this manner, the wearable computing device may bring into the view region portions of the menu (e.g., menu objects) that are not previously located inside the view region. In some embodiments, after the wearable computing device pans and/or rotates the menu, the user-interface may appear similar to the user-interface 500 described above in connection with FIG. 5C.

Further, in some embodiments, the wearable computing device may be further configured to receive selection data indicating a selection of a selected menu object from the menu, as described above. In response to receiving the selection data, the wearable computing device may cause the wearable computing device to provide the selected menu object in the view region. In some embodiments, after the wearable computing device receives the selection data, the user-interface may appear similar to the user-interface 500 described above in connection with FIG. 5D.

Still further, in some embodiments, the wearable computing device may be further configured to receive input data corresponding to a user input. The user input may allow the user to, for example, interact with the selected menu object, as described above. In some embodiments, after the wearable computing device receives the input data, the user-interface may appear similar to the user-interface 500 described above in connection with FIG. 5E.

Still further, in some embodiments, the wearable computing device may be further configured to receive removal data and may responsively remove the menu from the view region, as described above. In some embodiments, after the wearable computing device removes the menu from the view region, the user-interface may appear similar to the user-interface 500 described above in connection with FIG. 5A.

6. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
receiving data corresponding to a first position of a wearable computing device and responsively causing the wearable computing device to provide a user-interface comprising:
a view region, and
a menu, wherein the menu comprises a plurality of menu objects, wherein the view region substantially fills a field of view of the wearable computing device and the menu is not fully visible in the view region;
receiving movement data corresponding to an upward movement of the wearable computing device to a second position above the first position;
based on the movement data, making a first determination that the upward movement has an upward angular velocity along an upward direction;
making a second determination that the upward angular velocity exceeds a threshold upward angular velocity, wherein the threshold upward angular velocity is based on at least one of user preference or calibration data; and
responsive to the first and second determinations, causing the wearable computing device to move the menu such that the menu becomes more visible in the view region, wherein causing the wearable computing device to move the menu such that the menu becomes more visible in the view region comprises causing one or more of the menu objects to move downward with respect to the view region so as to become visible in the view region, and wherein individual menu objects visible in the view region are selectable by one or more additional movements.

2. The method of claim 1, wherein causing the wearable computing device to move the menu comprises causing the wearable computing device to move the menu at a rate based at least on the upward angular velocity.

3. The method of claim 1, wherein the menu is located above the view region.

4. The method of claim 1, wherein the menu is arranged along an at least partial ring located above the view region.

5. The method of claim 4, wherein the at least partial ring is substantially centered over the wearable computing device.

6. The method of claim 1, wherein when the wearable computing device is at the first position the view region is substantially empty.

7. The method of claim 1, wherein when the wearable computing device is at the first position the menu is not visible in the view region.

8. The method of claim 1, wherein the upward angular velocity comprises an average upward angular velocity over a period of time.

9. The method of claim 1, further comprising:
based on the movement data, making a third determination that the upward movement has a non-upward angular velocity along a non-upward direction; and
making a fourth determination that the non-upward angular velocity does not exceed a threshold non-upward angular velocity, wherein causing the wearable computing device to move the menu is further responsive to the third and fourth determinations.

10. A wearable computing device comprising:
at least one processor; and
data storage comprising instructions executable by the at least one processor to:
receive data corresponding to a first position of a wearable computing device and responsively cause the wearable computing device to provide a user-interface comprising:
a view region, and
a menu, wherein the menu comprises a plurality of menu objects, wherein the view region substantially fills a field of view of the wearable computing device and the menu is not fully visible in the view region;
receive movement data corresponding to an upward movement of the wearable computing device to a second position above the first position;
based on the movement data, make a first determination that the upward movement has an upward angular velocity along an upward direction;
make a second determination that the upward angular velocity exceeds a threshold upward angular velocity, wherein the threshold upward angular velocity is based on at least one of user preference or calibration data; and
responsive to the first and second determinations, cause the wearable computing device to move the menu such that the menu becomes more visible in the view region, wherein causing the wearable computing device to move the menu such that the menu becomes more visible in the view region comprises causing one or more of the menu objects to move downward with respect to the view region so as to become visible in the view region, and wherein individual menu objects visible in the view region are selectable by one or more additional movements.

11. The wearable computing device of claim 10, further comprising a display configured to provide the user-interface.

12. The wearable computing device of claim 10, further comprising a movement sensor configured to detect the upward movement.

13. The wearable computing device of claim 12, wherein the movement sensor comprises at least one of an accelerometer and a gyroscope.

14. The wearable computing device of claim 12, wherein the movement sensor is further configured to detect non-upward movement.

15. The wearable computing device of claim 10, wherein causing the wearable computing device to move the menu comprises causing the wearable computing device to move the menu at a rate based at least on the upward angular velocity.

16. The wearable computing device of claim 10, wherein the instructions are further executable by the at least one processor to:
based on the movement data, make a third determination that the upward movement has a non-upward angular velocity along a non-upward direction; and make a fourth determination that the non-upward angular velocity does not exceed a threshold non-upward angular velocity, wherein causing the wearable computing device to move the menu is further responsive to the third and fourth determinations.

17. A non-transitory computer readable medium having stored therein instructions executable by a computing device to cause the computing device to perform functions comprising:
  receiving data corresponding to a first position of a wearable computing device and responsively causing the wearable computing device to provide a user-interface comprising:
    a view region, and
    a menu, wherein the menu comprises a plurality of menu objects, wherein the view region substantially fills a field of view of the wearable computing device and the menu is not fully visible in the view region;
  receiving movement data corresponding to an upward movement of the wearable computing device to a second position above the first position;
  based on the movement data, making a first determination that the upward movement has an upward angular velocity along an upward direction;
  making a second determination that the upward angular velocity exceeds a threshold upward angular velocity, wherein the threshold upward angular velocity is based on at least one of user preference or calibration data; and
  responsive to the first and second determinations, causing the wearable computing device to move the menu such that the menu becomes more visible in the view region, wherein causing the wearable computing device to move the menu such that the menu becomes more visible in the view region comprises causing one or more of the menu objects to move downward with respect to the view region so as to become visible in the view region, and wherein individual menu objects visible in the view region are selectable by one or more additional movements.

18. The non-transitory computer readable medium of claim 17, wherein causing the wearable computing device to move the menu comprises causing the wearable computing device to move the menu at a rate based at least on the upward angular velocity.

19. The non-transitory computer readable medium of claim 17, wherein the menu is located above the view region.

* * * * *